June 30, 1953   L. C. CARISSIMI   2,643,453

ELECTRIC DRY SHAVER

Filed July 29, 1949

INVENTOR
Louis C. Carissimi
BY
ATTORNEY

Patented June 30, 1953

2,643,453

UNITED STATES PATENT OFFICE 2,643,453

ELECTRIC DRY SHAVER

Louis C. Carissimi, Fairfield, Conn., assignor to Remington Rand Inc., New York, N. Y., a corporation of Delaware Application July 29, 1949, Serial No. 107,589

6 Claims. (Cl. 30—43)

This invention relates to electric dry shavers and particularly to improvements in the oscillator mechanism of such shavers.

The invention provides a novel and improved method of mounting a rocker arm for the oscillator of an electric dry shaver whereby the assembly of the oscillator mechanism is made easier and lost motion or play is prevented. The invention further provides for a novel connection between the eccentric on the motor shaft and the rocker arm of the oscillator mechanism whereby manufacturing and assembly costs are reduced and a more satisfactory operation is obtained by having the oscillator drum formed with a molded insulating member formed with bearing surfaces for directly engaging the eccentric. The invention also provides an improved method of forming oscillator arms for multiple-head shavers which reduces the manufacturing and assembly costs.

Figure 2:
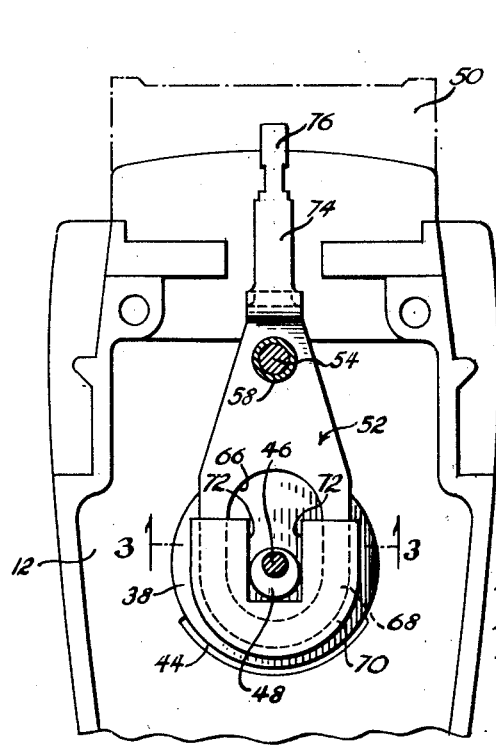
Fig. 2 is a fragmentary view taken on line 2—2 of Fig. 1 with the right-hand section of the casing removed and shows the oscillator arm and actuating eccentric in elevation.

The present invention is intended to be used in electric dry shaver constructions of a type in common use such as shown in Patents No. 2,368,951, February 6, 1945, and 2,415,715, February 11, 1947. Such dry shavers comprise a two-part sectional casing 10, 12 in which there is mounted an electromagnetic impulse motor which comprises a stator frame 14 having at one end thereof a field winding (not shown) and, between projecting poles at the other end thereof, a rotor 16.

The stator frame 14 is customarily and preferably constructed of laminations of magnetizable metal and is provided at the end in which the poles are formed with a pair of insulating bearing plates 18 and 20 which are preferably secured to the opposite side faces of the stator frame 14 by bolts or screws (not shown) and extend outwardly beyond the stator. A bearing 22 is mounted in an orifice in each of the bearing plates 18 and 20. The bearings 22 are in axial alignment and receive and support the rotor shaft 24 upon which the laminations of magnetizable material which preferably form the rotor 16 are mounted for rotation.

An elliptical cam 26 is provided at one end of the rotor shaft 24. The cam 26 lies between the contact arms 28 and cooperates with the bearing pads 30 of suitable insulating material which are attached, as by rivets 32, to the arms 28. By reason of its being elliptical in shape the cam 26 separates to make and break contacts 34, which are attached ot the free ends 36 of the contact arms 28 in facing relationship, twice during each revolution of the rotor 16. It will, of course, be understood that should a motor having more than two poles be employed in the shaver, cam 26 should be correspondingly modified in shape to bring about the proper making and breaking action of contacts 34 for operation of the motor.

A knurled starting wheel 38 is mounted adjacent the other end of the rotor shaft 24 on a threaded shaft extension 40 and is secured thereto by nut 42. When the shaver is assembled in casing sections 10, 12, access to one edge of starting wheel 38 is provided through port 44 in casing section 12.

Intermediate the starting wheel 38 and bearing 22 in which rotor shaft 24 is journaled there is provided a reduced portion 46 of the shaft 24. The eccentric 48 which is provided for rotor shaft 24 has a bore therethrough, one end of which is screw threaded for engagement with the threaded outer end 40 of shaft 24 and the other end of which is enlarged to snugly receive the reduced portion 46 of shaft 24. When eccentric 48 is mounted on rotor shaft 24 it is locked in place thereon by handwheel 38 and nut 42 and will accordingly rotate with shaft 24.

Eccentric 48 transmits motion from the motor of the electric shaver to the movable cutter (not shown) in the cutting heads 50 mounted on the end of the casing. The rotary motion of shaft 24 is converted to a reciprocating oscillatory motion by oscillator arm 52 for moving the movable cutters. The oscillator arm 52 is supported by insulating bearing plates 18, 20 on shaft 54 passing through aligned holes 19 and 21 in the insulating bearing plates.

Shaft 54 is provided at one end with an enlarged head 56 and projects through a bore 53 in the oscillator arm 52 with the enlarged head 56 in contact with one side of the arm. The washers 58 and 60, slidably mounted on the shaft 54, are interposed between the other side of the oscillator arm 52 and the insulating bearing plate 20. A coil spring 62 surrounds the shaft 54 between the bearing plates 18 and 20 and is held on the shaft under compression by a retaining clip 64 which engages in a groove formed in shaft 54. The other end of the shaft 54 projects through bearing plate 18. As thus mounted, oscillator arm 52 is pivoted on the shaft 54 and is resiliently held spaced the proper distance from bearing plate 20 by the washers 58 and 60 and the spring 62.

The lower end or terminal portion of oscillator arm 52 is greater in width and has an elongated orifice 66 formed therein leaving at the bottom of the arm 52 a relatively narrow curved portion 68. A sheath 70 of plastic material, such as "nylon," having high resistance to abrasion, high dielectric strength and good resiliency, with low moisture absorption is molded about the lower end of the arm 52 so as to project into the orifice 66 around at least the lower end and a portion of the sides thereof.

The inside of sheath 70 is formed to provide flat, parallel, opposite bearing faces 72 spaced apart a distance equal to the diameter of the eccentric 48. Consequently, the eccentric in rotating bears against one or the other of the bearing faces 72 and thereby produces lateral motion of the lower end of the oscillator arm 52. Since the arm 52 is pivoted on the shaft 54 the lateral motion given to the lower end of the arm by the thrust of the eccentric 48 produces lateral motion of the other end of said arm which projects upwardly from the point of mounting on shaft 54.

Formation of the lower end of the arm 52 as an eye is preferred since there is thus no possibility of temperature changes causing temporary warping or distortion of the metal adjoining the open space during the molding of the nylon or otherwise, as might occur if the metal is not continuous. Such distortion would result in improper spacing of the plastic bearing portions 72 and imperfect operation of the shaver. Moreover, the sheath will be prevented from coming off the arm 52 even if the adhesion of the plastic to the metal is lost. Nevertheless, if desired, the bottom of the narrow portion 68 may be omitted thus making the lower end of the arm 52 a yoke rather than an eye.

In the construction shown in the drawings, it will be observed that provision has been made for three cutter heads 50 of conventional form in the electric dry shaver illustrated. The cutter in each of these heads is required to oscillate within the head and accordingly means must be provided to impart oscillatory movement thereto. Hitherto there has been provided for this purpose a plurality of arms separated by washers mounted on a shaft or bushing attached to the shaver casing and actuated by a rocker arm driven by an eccentric on the motor shaft. The assembly of such washers and their mounting is inconvenient and expensive. By the present invention means is provided for equipping an oscillator arm with auxiliary projecting members for the actuation of a plurality of cutters.

Figure 1:
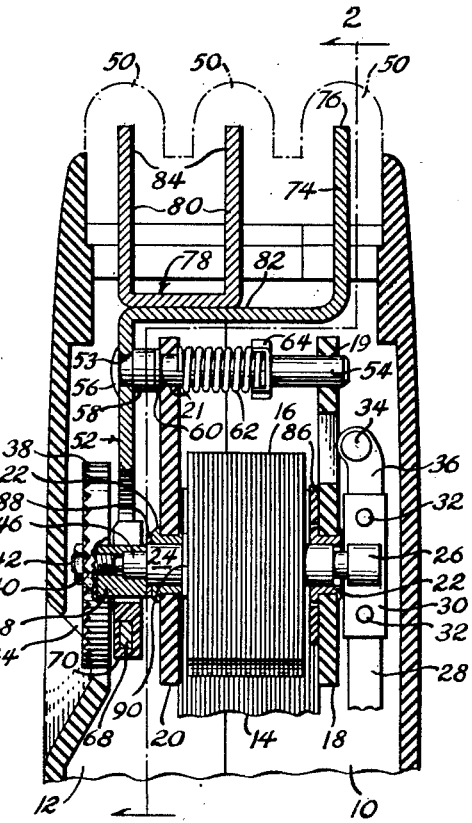
Fig. 1 is a fragmentary, transverse, sectional view through a portion of a multiple-head shaver casing illustrating the arrangement of the motor, oscillator mechanism, and cutter heads.
Figure 3:
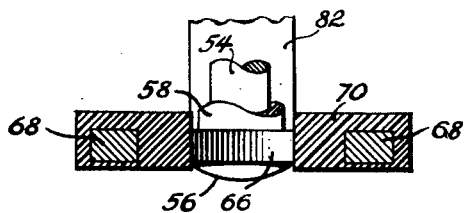
Fig. 3 is an enlarged sectional view on line 3—3 through the novel oscillator arm of the present invention.

A will be seen from the drawings, and particularly Fig. 1, the oscillator arm 52 is Z-shaped, being bent back over the motor above the shaft 54 and being again bent so that the outer end 74 is preferably substantially parallel with the lower end of the arm, though laterally displaced. The tip 76 of the outer end 74 of the arm 52 is reduced in size and adapted to be inserted in the slot usually provided in the movable cutter (not shown) of one of the cutting heads 50. A U-shaped member 78 having outwardly extending legs 80 of approximately equal length is attached by having the outer flat portion of its base welded or secured by other suitable means, to the flat portion of intermediate portion 82 of the oscillator arm 52. The outwardly extending ends 84 of the legs 80 are formed like the tip 76 of the arm 52 and the ends 84 and the tip 76 are arranged substantially in a plane normal to the lower end of the arm 52. In attaching the U-shaped member 78 to oscillator arm 52, the member is placed so that the ends 84 may be engaged in the cutters of the other two cutter heads 50 of the electric shaver.

Interposed between rotor 16 and insulating bearing plate 18 there is provided an insulating shield 86. On the other side of the rotor 16, washers 88 and 90 are disposed on opposite sides of the bearing 22. These washers serve as thrust bearings and absorb the wear resulting from the endwise or axial motion of the shaft 24 in the bearings 22.

Several important improvements in the construction of electric dry shavers have been provided by the present invention. It has been customary in dry shaver construction for the oscillator arm to be pivotally mounted on one section of the casing by a bolt or screw. Consequently in assembling a shaver the mounting of the oscillator arm required a separate operation before the motor and eccentric could be placed in position.

As shown in Fig. 1 the improved oscillator arm of the present invention is mounted on a shaft 54 supported on the motor frame and thus the oscillator arm is a part of the motor unit. The arm may be quickly mounted or removed when necessary and play in the mounting is at all times taken up by the resilience of spring 62. The removal of lost motion or play in the mounting of the arm 52 is important since, if such play is permitted to exist, undue wear will take place between the eccentric and the oscillator arm and the functioning of the cutters actuated by the oscillator arm will not be uniform.

Applicant's construction providing means at the upper end of the oscillator arm 52 for actuating a multiplicity of cutters has previously been pointed out as an improvement over the constructions hitherto used. The attachment to the outer end of the arm 52 of an element such as the U-shaped member 78, is a simple operation and the auxiliary member, being once attached, remains in desired position at all times. The assembly of such an auxiliary member with an oscillator arm is a much simpler and less expensive operation than that necessary when using the separate washer and arm assembly of the known construction, since the latter requires machining and mounting on a shaft or bushing.

The improvement in the portion of the oscillator arm which cooperates with the eccentric is a particularly important and useful one. In the construction ordinarily used with shavers of the type illustrated the lower end of the oscillator arm is formed as a yoke within which the eccentric revolves. Since it is important that no current should have an opportunity to reach the cutter heads of the shaver, insulation between the rotor shaft and the eccentric and the oscillator arm is required. This, in the past, was provided by an insulating ring which was placed over the eccentric and prevented contact between the eccentric and the oscillator arm. The disadvantages of this type of construction are manifold. In the first place, the number of parts required is excessive. In the second place, the close tolerances specified in shaver construction make the above described arrangement expensive because of the large amount of machining required.

Thus the bearing surfaces on the inside of the yoke of the rocker arm must be machined, the outside of the eccentric must be machined, and both the inside and outside of the insulating roller must be machined. It is evident that even with close tolerances specified, the aggregate departure from the desired fits may be considerable.

By the construction disclosed in the present application the obtaining of a proper fit between the eccentric and the oscillator arm is made much easier since the nylon sheath on the oscillator arm provides the electrical insulation required and is hard and tough enough to resist wear. Accordingly, the eccentric 48 may be made of hardened steel, and with a proper fit of the eccentric between the machined faces 72 of the nylon sheath 70, neither the eccentric nor the nylon sheath will show appreciable wear even after a long period of operation. The amount of machining required is reduced and the elimination of the insulating roller simplifies the assembly of the shaver.

From the foregoing description, it will be apparent that shavers constructed in accordance with the present invention will be less expensive to manufacture and will be more satisfactory in use.

The invention claimed is:

1. In an electric shaver having an electromagnetic impulse motor comprising a stator, a rotor, a shaft for said rotor, bearings for said shaft mounted in a pair of insulating bearing plates attached to said stator on opposite sides thereof, a starting wheel on one end of said rotor shaft, a cam adapted for engaging and periodically separating make and break contacts on the other end of said rotor shaft, and an eccentric mounted on said shaft between said starting wheel and one of said bearings, the combination therewith of a Z-shaped oscillator arm wider at one end than at the other, having in the wider end thereof an orifice encircling said eccentric and having the narrower end thereof adapted for engagement with and actuation of a cutter, an insulating plastic sheath formed of nylon molded on said arm around at least a portion of said orifice and having parallel faces inside said orifice engaging and cooperating with said eccentric for actuation of said arm, and a member attached to the intermediate portion of said arm and having an outwardly extending leg, the leg of said member being formed like the narrower end of said arm, and said leg and said narrower end terminating substantially in a plane normal to the wider end of said arm, said arm being pivotally mounted at a point in the wider end thereof by means engaging said insulating bearing plates.

2. An oscillator arm for an electric shaver comprising a Z-shaped member wider at one end than at the other, said wider end thereof having an orifice adapted to encircle an eccentric and said narrower end thereof being adapted for engagement with and actuation of a cutter, an insulating plastic sheath formed of nylon molded on said arm around at least a portion of said orifice and having parallel faces inside said orifice adapted to cooperate with said eccentric for actuation of said arm, and a second U-shaped member attached to the intermediate portion of said arm and having a pair of outwardly extending legs substantially equal in length, each leg of said second member being formed like the narrower end of said arm, and said leg and said narrower end terminating substantially in a plane normal to the wider end of said arm, said arm having means adapted for pivotal mounting thereof.

3. An oscillator arm for an electric shaver having an orifice adapted to encircle an eccentric, and an insulating plastic sheath formed of nylon molded on said arm and forming a lining around at least a portion of said orifice, said sheath being provided with parallel faces inside said orifice adapted to cooperate with said eccentric for actuation of said arm.

4. An oscillator arm for electric shavers having independent spaced movable cutters forming part of cutting means on one end of a casing containing an electric motor having an eccentric rotated during operation thereof, comprising a sheet metal strip having opposite ends offset in spaced substantially parallel relation and connected at adjacent ends by a substantially perpendicular intermediate portion, one end having pivot means mounting said arm on said shaver for oscillating movement and the terminal portion formed with an opening having opposed portions at opposite sides thereof receiving motion transmitted by said eccentric to oscillate said arm, the other end of said arm engaging one of said movable cutters, and a U-shaped metal strip having spaced substantially parallel legs at opposite ends of the central connecting portion, said connecting portion mounted in superimposed aligned relation and rigidly secured on said intermediate portion with one end terminating adjacent said one end of said first-mentioned strip, said legs extending in spaced substantially parallel relation to each other and said other end of said first-mentioned strip, said legs lying in the same plane with and extending in the same direction from said intermediate portion as said other end of said first-mentioned strip and said legs having the free ends operatively and independently engaged with individual spaced movable cutters from the one engaged by said other end for simultaneous operation of all movable cutters in movement of said arm.

5. An oscillator arm for electric shavers having shaving means on one end of a casing containing an electric motor formed with spaced shaving portions, separate spaced movable cutters cooperating with the spaced shaving portions, comprising an elongated sheet metal strip having an intermediate portion and one end portion extending in substantially right angular relation from an end of said intermediate portion, said end having a pivot portion adjacent said intermediate portion and a terminal portion of said end formed with an opening receiving an eccentric on said motor with parts of said terminal portion at opposite sides of said eccentric for transmitting the thrust of said eccentric to oscillate said arm on its pivot, and a U-shaped strip having spaced substantially parallel legs at opposite ends of a central connecting portion, said central connecting portion being superimposed and rigidly secured to said intermediate portion with said legs extending in a direction opposite said one end portion and having the free ends of said legs engaging said separate movable cutters for simultaneously reciprocating said cutters in oscillation of said arm by said motor and eccentric.

6. An oscillator arm and mounting for electric shavers having an electric motor in a casing and shaving means on one end of said casing, comprising spaced parallel bearing plates on said motor having aligned bearing holes, a shaft having opposite ends extending through said holes and rotatably supported by said plates, an oscillator arm having one end portion secured to one terminal of said shaft beyond said bearing plates, spacing means on said shaft between said end portion of said arm and the adjacent bearing plate, a retaining clip mounted on said shaft between said bearing plates, a compression spring mounted on said shaft between said retaining clip and said last-mentioned bearing plate, said arm having the terminal portion of said one end portion formed with an opening to receive an eccentric on said motor for peripheral transmission of the thrust of said eccentric to the terminal portions of said arm at opposite sides of said opening for oscillating said arm, and the opposite end of said arm being formed to engage and operate said shaving means when oscillated by said motor.

LOUIS C. CARISSIMI.

References Cited in the file of this patent

UNITED STATES PATENTS

| Number | Name | Date |
| --- | --- | --- |
| 1,671,265 | Andis | May 29, 1928 |
| 1,839,924 | Lutes | Jan. 5, 1932 |
| 2,083,579 | Schmitt | June 15, 1937 |
| 2,281,753 | Dalkowitz | May 5, 1942 |
| 2,287,337 | Zimmermann | June 23, 1942 |
| 2,304,909 | Hanley | Dec. 15, 1942 |
| 2,314,073 | Campbell | Mar. 16, 1943 |
| 2,509,868 | Irrgang | May 30, 1950 |